United States Patent
Durie et al.

(10) Patent No.: US 6,203,437 B1
(45) Date of Patent: Mar. 20, 2001

(54) FLEXIBLE COUPLING

(75) Inventors: Allistair David Durie; Robert Michael Barton, both of Huddersfield (GB)

(73) Assignee: Reliance Gear Company Limited (GB)

( * ) Notice: Subject to any disclaimer, the term of this patent is extended or adjusted under 35 U.S.C. 154(b) by 0 days.

(21) Appl. No.: 09/242,701

(22) PCT Filed: Aug. 19, 1997

(86) PCT No.: PCT/GB97/02233

§ 371 Date: Apr. 22, 1999

§ 102(e) Date: Apr. 22, 1999

(87) PCT Pub. No.: WO98/09090

PCT Pub. Date: Mar. 5, 1998

(30) Foreign Application Priority Data

Aug. 30, 1996 (GB) .................................................. 9618217

(51) Int. Cl.[7] ................................. F16D 3/52; F16D 3/72
(52) U.S. Cl. ................................................ 464/78; 403/220
(58) Field of Search ........................... 464/78, 87, 91, 464/94, 96, 106, 185, 147, 904; 403/220, 223, 224, 226, 228, 229

(56) References Cited

U.S. PATENT DOCUMENTS

| 1,557,958 | 10/1925 | Anderson . | |
|---|---|---|---|
| 1,558,576 | 10/1925 | Baumann . | |
| 3,071,942 | * 1/1963 | Alcaro | .................................... 464/78 |
| 3,150,506 | * 9/1964 | Alcaro | .................................... 464/78 |
| 3,390,546 | * 7/1968 | Jewel | ...................................... 464/78 |
| 3,844,137 | 10/1974 | Zugel . | |
| 4,203,305 | * 5/1980 | Williams | ................................ 464/78 |
| 4,449,955 | * 5/1984 | Watanabe et al. | ...................... 464/78 |
| 4,858,897 | * 8/1989 | Irifune | .................................... 464/78 |
| 5,062,619 | * 11/1991 | Sato | ........................................ 464/78 |
| 5,238,454 | 8/1993 | Schmidt . | |
| 5,324,235 | * 6/1994 | Tomii et al. | ............................ 464/78 |

FOREIGN PATENT DOCUMENTS

| 1775056 | 3/1972 | (DE) . |
| 2435450 | 2/1976 | (DE) . |
| 3719900 | 12/1988 | (DE) . |
| 215725 | 3/1987 | (EP) . |
| 271355 | 6/1988 | (EP) . |
| 318669 | 6/1989 | (EP) . |
| 808205 | 2/1937 | (FR) . |
| 2271452 | 12/1975 | (FR) . |

* cited by examiner

Primary Examiner—Lynne H. Browne
Assistant Examiner—Kenneth Thompson
(74) Attorney, Agent, or Firm—MacMillan, Sobanski & Todd, LLC

(57) ABSTRACT

A flexible coupling for connecting a pair of rotating elements, comprising a body part (10) adapted at each end to receive part of the rotating elements, and comprising four slits (20a) each slit being longitudinally and angularly spaced from the other slits, each slit terminating in a concave face (24). The invention provides advantages over known flexible couplings since the provision of arcuate and concave end faces on each slit produces an increased material overlap with adjacent slits which decreases variations in torsional stiffness but does not affect the flexibility of the coupling.

14 Claims, 1 Drawing Sheet

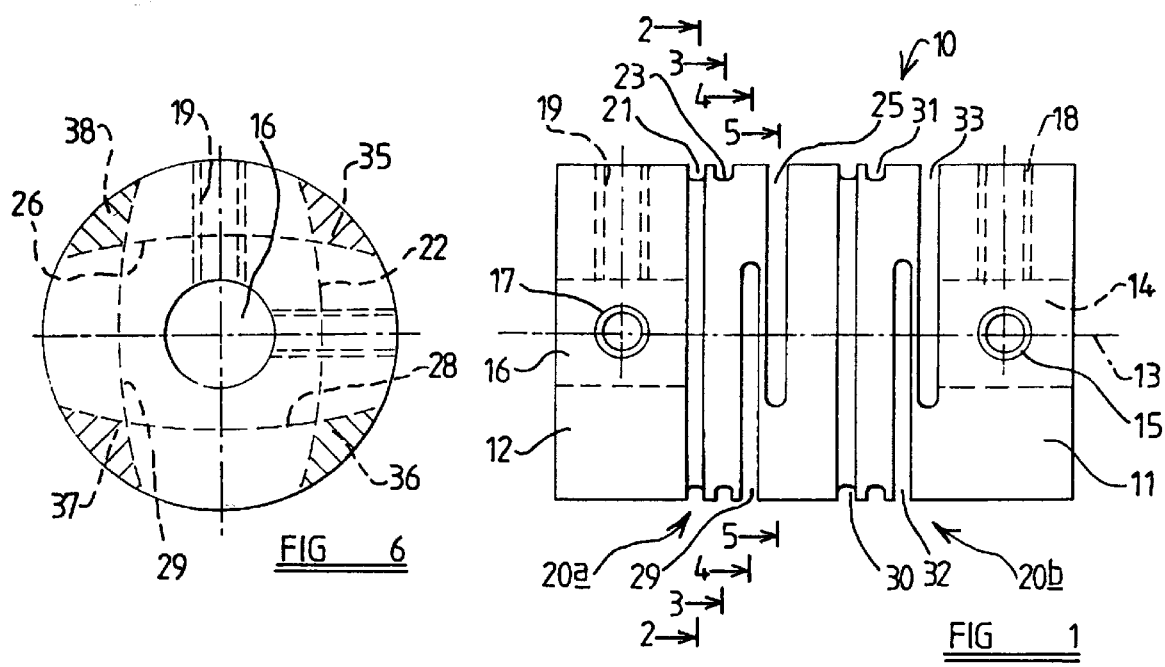
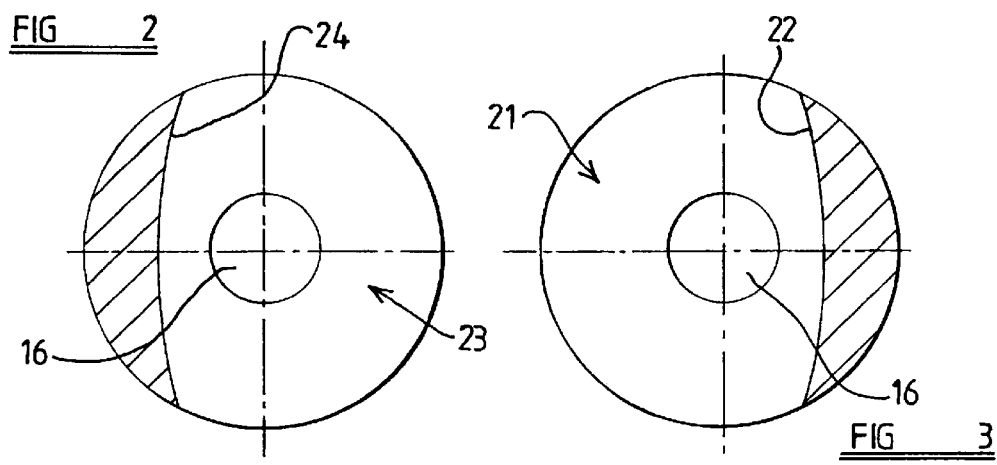
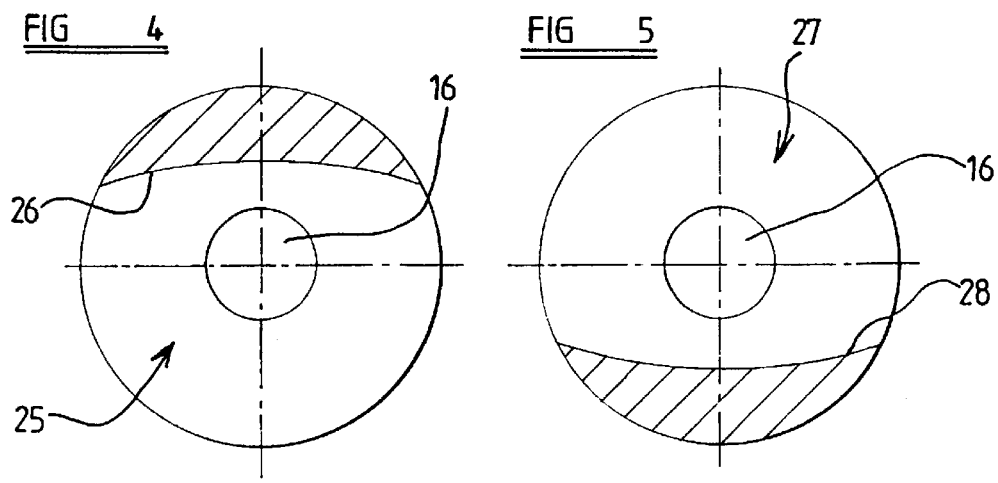

FLEXIBLE COUPLING

The present invention relates to a flexible coupling adapted to provide a connection between two shafts, each of the shafts being capable of rotational movement or at least limited rotational movement and the arrangement being such that the rotational axis of one shaft may at some time be out of alignment with the rotational axis of the other.

It may be important, particularly with control devices that the position of one shaft is accurately transmitted to another shaft and, when as aforementioned, the rotational axes of the shafts are out of alignment with each other. A flexible coupling between the two shafts that enables the angular position of one shaft to be accurately transmitted to the other, is of great importance.

Flexible couplings are known and may comprise a cylindrical piece of material, each end of the cylinder having connection means to enable a shaft to be connected thereto and an intermediate part of the cylinder being provided with a plurality of radial slits spaced longitudinally from each other, to enable some flexibility in the cylinder, i.e., bending about its longitudinal axis.

It is an object of the present invention to provide a new or improved flexible coupling.

According to one aspect of the present invention, we provide a flexible coupling for connecting a pair of elements capable of at least limited rotational movement, the flexible coupling comprising a body part having two ends, each end being connectable to a respective one of said pair of elements, said body part having at least four slits, each slit extending through the body in a radial direction to a depth beyond the centre-line of the body and each slit being spaced from the others, in a direction between the ends of the body and being angularly spaced around the circumference of the body, each slit terminating in a concave face.

Preferably, the four slits comprise a first slit, a second slit adjacent thereto, angularly spaced around the circumference by approximately 180°, a third slit adjacent to said second slit and angularly spaced around the circumference by 90° to the first and second slits, and a fourth slit adjacent said third slit, angularly spaced at 180° to said third slit.

Preferably, said flexible coupling comprises two sets of four slits and conveniently, each set of four slits is as above described.

A coupling having only one set of four slits is able to accommodate the situation wherein the rotational axes of the elements it connects intersect but are inclined to one another whilst a coupling having two sets of four slits is able additionally to accommodate the situation wherein the axes of the elements it connects do not intersect. In the latter case the coupling can be considered as analogous in its behaviour in some respects to a drive shaft assembly comprising two Hookes universal joints connected by an intermediate shaft element. Thus the two sets of slits may be separated by a length of the body part which is relatively greater than the length of the body part occupied by a single slit—the length of the separating body part approximating to the length of the intermediate shaft element in the analogy referred to, and a greater such length allowing a greater offset between the axes.

Preferably the arrangement of the slits in one set is the same as that in th set, considered in one direction lengthwise of the coupling (as distinct from the sets being mirror images of one another).

Preferably, each of said slits extends into the body by the same depth as the other slits.

By way of example, each slit may extend into the body to a maximum depth of between ⅝ to ⅞ the dimension of the body in a radial direction. Conveniently, the maximum depth of each slit is approximately ¾ of the dimension of the body in a radial direction.

Conveniently, the radius of the concave surface at which each slit terminates may be between 1.2 and 2 times the dimension of the body in a radial direction. Conveniently, the radius of the concave surface at which each slit terminates is approximately 1.5 times the dimension of the body in the radial direction. As described hereafter, such an arrangement of slits produces the effect that as a set of slits is viewed axially of the coupling, the areas of material remaining at the slits overlap one another. There would be four such overlap areas in a set of four slits, in a "square" array.

Preferably, the body is cylindrical, the ends of the cylinder comprising the two ends of the body.

Preferably, said connection means comprises a bore at each end of the body, into which said pair of elements may respectively be inserted. Securing means may be provided to secure the ends of said elements in the ends of the body.

A flexible coupling according to the present invention has been found to provide a coupling of high torsional stiffness, hence minimising any wind-up in the coupling that may be caused by resistance in the driven side of the coupling caused by friction and/or inertia that may otherwise happen during acceleration of the driving side of the coupling.

The coupling has a low radial rigidity, i.e. is sufficiently flexible to minimise the loads induced on bearings of both the driving and driven elements when there is mis-alignment between the respective rotational axes. Also this results in a long service life for the coupling.

The form of the coupling, in conjunction with the combination of the torsional stiffness and low radial rigidity, ensures that accurate transmission of velocity and hence an accurate reproduction of the position of the driven member to the driving member is provided.

The slits may be provided in the body by cutting with a rotating cutting tool and preferably, the radius of the rotating cutting tool is the same as the radius of the arcuate shape required at the base of each slit.

A cutting tool rotating about an axis parallel to the axis of the body part of the coupling may be moved radially of the body part to form each slit, and then withdrawn in the opposite direction. When the coupling comprises two sets of four slits which are in the same arrangement as each other, a spindle carrying two cutters may be used to form the corresponding slits of each set simultaneously.

However, it will be appreciate that other methods could be utilised to form the slits in the coupling.

The body part of the coupling may be of metal, e.g. an aluminium alloy, a stainless steel, or any other material suitable for the use to which the coupling is to be put. For example, the coupling could be of a plastics material. It may be possible for the coupling to be made by a casting or moulding process, with the slits being provided in the course of such process rather than as a subsequently performed cutting operation.

The invention will now be described in more detail, by way of example only with reference to the accompanying drawings wherein:

FIG. 1 is a view of one embodiment of a flexible coupling,

FIG. 2 is sectional view of the coupling shown in FIG. 1 on the line 2—2,

FIG. 3 is a sectional view of the coupling shown in FIG. 1 along the line 3—3,

FIG. 4 is a sectional view of the coupling shown in FIG. 1 along the line 4—4,

FIG. 5 is a sectional view of the coupling along the line 5—5,

FIG. 6 is an end view of the coupling shown in FIG. 1.

A flexible coupling has a body part 10, having a first end part 11 and a second end part 12, a longitudinal axis 13 and is generally cylindrical in shape.

The end part 11 is provided with a central bore 14 adapted to receive a driving or driven shaft, the shaft being securable in the bore 14 by means of a threaded fastener (not shown) inserted into the threaded bore 15.

The end part 11 may be provided with a further threaded bore 18 in which a fastener may be secured to provide additional securement of any shaft located therein.

The end 12 is provided with a bore 16, into which a driven or driving shaft respectively may be inserted, the shaft being secured in position by a threaded fastener (not shown), threadedly engaged in a threaded bore 17.

The end 12 is provided with an additional threaded bore 19 in which a threaded fastener may be engaged so as to provide further securement to any shaft located therein.

In order to provide flexibility to the coupling 10, a plurality of radially extending slits are formed in the body 10 and in the embodiment shown, two sets of four slits are provided, a first set generally indicated at 20a and a second set generally indicated at 20b.

The first set of slits 20a will now be described with additional reference to FIGS. 2 to 6.

The first slit 21 is formed by any suitable manner and preferably by a rotating cutting tool. The dimensions of the depth of the slit 21 are shown in FIG. 2 where it can be seen that the slit 21 extends approximately 0.75 of the way through the cylindrical body 20. The slit 21 terminates in an arcuate face 22, the radius of curvature of which in the embodiment shown is approximately 1.5 times the depth, i.e. diameter, of the body 21 or approximately three times the radius of the body 10.

The second slit 23, the extreme ends of which are just visible in FIG. 1, is shown in more detail in FIG. 3, the second slit 23 terminating in concave face 24, the radius of curvature of which is the same as that of the face 22.

It will be seen from the drawings that the slit 23 is formed angularly spaced around the circumference so that it is diametrically opposite (180°) to the first slit 21.

A third slit 25 is formed to the same depth of slits 21 and 23 and finishes in a concave face 26 of the same radius of curvature of the faces 22 and 24, however, the slit 25 is angularly spaced around the circumference, so that it is formed at approximately right angles to the slits 21 and 23.

A fourth slit 27 comprises the final slit in the set. The slit 27 is formed to the same depth as slits 21, 23 and 25 and terminates in a concave face 28 of the same radius of curvature as the concave faces 22, 24 and 26. The slit 27 is formed so that it is angularly displaced around the circumference by 180° to the slit 25 and angularly displaced by 90° to the slits 21 and 23.

The body 10 is formed with a second set of slits 20b comprising a fifth slit 30, a sixth slit 31, a seventh slit 32 and an eighth slit 33. The shape and depth of the slits 30 to 33 correspond exactly with the formation of the first set of slits 20, thus the slit 30 is the same as the shape of the slit 21 shown in FIG. 2. The slit 31 is the same as the slit 23 shown in FIG. 3, the slit 32 is the same as the slit 25 shown in FIG. 4 and slit 33 is the same as the slit 27 shown in FIG. 5.

It will be noted that in the two sets of slits 20a, 20b, the order of slits is the same as each other, i.e. one set of slits is not a mirror image of the other. This has the result that when the coupling is rotating while bent, the length of the coupling over which individual bending actions take place is the same, despite rotation of the coupling. This gives improved coupling performance.

The exact depth of the slits, the radius of curvature of the concave face in which they terminate and the width of each slit, will depend upon the conditions of use to which the coupling is to be subjected and the material from which it is made. In the embodiment shown, it may be made from an aluminium alloy, and the diameter of the body is approximately 20 mm, the radius of curvature of the concave faces may be between 25 mm and 40 mm and is conveniently mid-way between the above two values, the width of each slit may be approximately 1 mm and the distance between each slit in the side may be approximately 0.5 mm.

Whereas the above values have been found to be suitable for the embodiment shown in the drawings, it will be appreciated that for different materials and for different uses, different values may be appropriate.

In lateral view of the coupling, each slit is illustrated as having a semi-circular base. In practice, it may prove to be difficult to dress a cutter to give exactly this configuration of slit base, although obviously, it is desirable that angular corners which would act as stress raisers should be avoided at the bases of the slits.

The flexible coupling of the present invention has been shown to provide a considerable improvement over known devices and the provision of the arcuate and concave end faces of each slit produces an increased material overlap with adjacent slits compared with a slit having a straight end face so that there is more material remaining in the body at the crucial overlap areas, the overlap areas being shown at 35, 36, 37 and 38 in FIG. 6, these overlap areas representing overlaps in a single set of slits.

The increase in the overlap whilst not adversely affecting the flexibility of the coupling decreases variations in torsional stiffness that occur in flexible couplings having a straight end face to each slit. The increased torsional stiffness, or at least the increased linearity of the torsional stiffness, coupled with the provision of two sets of slits minimises the radial rigidity, decreases angular variation in torsional stiffness and hence improves the kinematic error of the coupling by maintaining a constant pivot length which travels along the coupling as it rotates.

The precise reasons for the improvement in performance is not fully understood, however, a comparison was carried out between a known product having similar slit design with a straight face at the base thereof. The coupling was 20 mm in diameter and 25 mm long.

Four important criteria of a device according to the present invention were compared to a prior art coupling.

1. Transmission Error

Sometimes referred to as kinematic error, which is the total error in the driven shaft position with respect to the driving shaft position. The transmission error is tested between the driving shaft and a driven shaft that are parallel to each other and have axis which are offset by 0.2 mm.

2. Torsional Stiffness

This is a measure of the resistance to relative rotation of the driving shaft position with respect to the driven shaft position under an applied torque. This test is carried out by fixing one shaft and measuring the position of the other as torque is applied.

3. Radial Compliance

This measures the offset between the driving and driven shaft either parallel or angular which is introduced under parallel or angular forces. The measurement is carried out by fixing one shaft and allowing the other to move by some parallel offset, and measuring the force required to produce the offset.

4. Torque Capacity

This is the torque that can be safely transmitted without damage to the coupling.

Torsional stiff

|  | NEW DESIGN | PRIOR ART |
|---|---|---|
| 1. Transmission Error (at 0.2 mm offset, unidirectional) | 106 arc seconds | 213 arc seconds |
| 2. Torsional stiffness | 125 Nm/radian | 79 Nm/radian |
| 3. Radial Compliance | 64 micron/newton | 19 microns/newton |
| 4. Torque Capacity (at 0.2 mm offset and 3Nm load) | 14 million (no failure) | Failed at 14 million |

It can be seen from the above results that there is significant improvement in transmissional error, torsional stiffness, radial compliance and torque capacity, and whereas the torque capacity will probably need many tests to have any significance, the results from the other tests show quite an extraordinary improvement over prior art designs.

It will be appreciated that means other than the provision of fasteners in threaded bores 15, 18 may be provided for securing the coupling to elements such as shafts to be connected. For example, it would be possible for one or both body part ends to be formed as a longitudinally split clamp, able to be clamped onto a shaft by an appropriately disposed fastener or fasteners. As a yet further alternative, one or both body part ends could be formed as a connection flange for bolted connection to appropriate rotary elements. Other configurations would be possible.

The features disclosed in the foregoing description, or the following claims, or the accompanying drawings, expressed in their specific forms or in terms of a means for performing the disclosed function, or a method or process for attaining the disclosed result, as appropriate may, separately or in any combination of such features, be utilised for realising the invention in diverse forms thereof.

What is claimed is:

1. A flexible coupling for connecting a pair of elements which are capable of at least limited rotational movement, said flexible coupling comprising a body having two longitudinally spaced ends and a center line extending between said ends, each end being connectable to a respective one of the pair of elements, said body having at least four slits therein, each slit extending through said body in a radial direction to a depth beyond the center line of the body and terminating in a concave face, wherein each slit is spaced from the others in said longitudinal direction between the ends of the body, and wherein said slits are angularly spaced around a circumference of said body.

2. A flexible coupling according to claim 1, wherein said slits comprise a first slit, a second slit adjacent said first slit and angularly spaced around said body circumference approximately 180° from said first slit, a third slit adjacent to said second slit and angularly spaced around said body circumference by approximately 90° from said first and second slits, and a fourth slit adjacent said third slit and angularly spaced around said body circumference by approximately 180° from said third slit.

3. A flexible coupling according to claim 1, and wherein said slits comprises first and second sets of four slits.

4. A flexible coupling according to claim 3, wherein each slit has a predetermined dimension in said longitudinal direction wherein said first and second sets of slits are separated on said body in said longitudinal direction by a spacing greater than said predetermined dimension.

5. A flexible coupling according to claim 3 wherein the four slits in said second set of slits have the same angular arrangement as corresponding four slits in said first set of slits in said longitudinal direction.

6. A flexible coupling according to claim 1, and wherein each of said slits extends into said body to the same depth as the other slits.

7. A flexible coupling according to claim 6, and wherein each slit extends into said body to a maximum depth of between ⅝ and ⅞ of a diameter of said body perpendicular to said center line.

8. A flexible coupling according to claim 7 and wherein the maximum depth of each slit is approximately ¾ of said diameter of said body.

9. A flexible coupling according to claim 7, and wherein said concave face of each of said slits has a radius of between 1.2 and 2 times said diameter of said body.

10. A flexible coupling according to claim 7, and wherein said concave face of each of said slits has a radius of approximately 1.5 times said diameter of said body.

11. A flexible coupling according to claim 1, and wherein said body has a bore at each end thereof adapted to receive an end of an element, and further including means on said body adapted to secure an end of an element in each bore.

12. A flexible coupling according to claim 1, and wherein said body is a casting or a molding.

13. A flexible coupling according to claim 1, and wherein said body has a diameter of approximately 20 mm, wherein said concave face in each slit has a radius of between 25 mm and 40 mm, wherein each slit has a width in said longitudinal direction of approximately 1 mm, and wherein the spacing between each adjacent slit in said longitudinal direction is approximately 0.5 mm.

14. A flexible coupling according to claim 13, and wherein each of said slits extends into said body to a maximum depth of between 12.5 mm and 17.5 mm.

* * * * *

UNITED STATES PATENT AND TRADEMARK OFFICE
CERTIFICATE OF CORRECTION

PATENT NO. : 6,203,437 B1
DATED : March 20, 2001
INVENTOR(S) : Alistair David Durie; Robert Michael Barton It is certified that error appears in the above-identified patent and that said Letters Patent is hereby corrected as shown below:

The name of the first inventor should be changed from "Allistair David Durie" to "Alistair David Durie"

Signed and Sealed this

Eleventh Day of December, 2001

*Attest:*

Nicholas P. Godici

NICHOLAS P. GODICI
*Attesting Officer*    *Acting Director of the United States Patent and Trademark Office*